United States Patent
Harris

(10) Patent No.: US 6,654,996 B1
(45) Date of Patent: Dec. 2, 2003

(54) TUBE REMOVER AND METHOD FOR AXIALLY REMOVING A METAL TUBE

(76) Inventor: Richard T. Harris, 119 S. Crest Rd., Chattanooga, TN (US) 37404

( * ) Notice: Subject to any disclaimer, the term of this patent is extended or adjusted under 35 U.S.C. 154(b) by 0 days.

(21) Appl. No.: 08/895,972

(22) Filed: Jul. 17, 1997

Related U.S. Application Data

(60) Provisional application No. 60/022,106, filed on Jul. 17, 1996.

(51) Int. Cl.[7] ................................................. B23P 19/04
(52) U.S. Cl. ....................... 29/426.4; 29/426.5; 29/727; 72/196; 72/197
(58) Field of Search ................................ 29/426.5, 727, 29/890.03, 890.031, 33 T, 426.4, 564.1, 282, 283.5; 72/185, 186, 196, 197

(56) References Cited

U.S. PATENT DOCUMENTS

| | | | | |
|---|---|---|---|---|
| 3,162,231 A | * | 12/1964 | Emerson | 72/191 |
| 3,628,246 A | | 12/1971 | Bronne et al. | 30/92.5 |
| 3,785,026 A | * | 1/1974 | Ohmstede | 29/558 |
| 3,835,520 A | | 9/1974 | Sismore | 29/202 D |
| 4,044,444 A | * | 8/1977 | Harris | 29/727 |
| 4,590,749 A | * | 5/1986 | Temple et al. | 53/576 |
| 4,815,201 A | | 3/1989 | Harris | 29/727 |
| 5,276,965 A | | 1/1994 | Hahn et al. | 29/890.03 |
| 5,293,682 A | | 3/1994 | Hahn et al. | 29/727 |
| 5,535,505 A | * | 7/1996 | Harris | 29/727 |
| 5,575,065 A | * | 11/1996 | Harris | 29/890.03 |
| 5,621,966 A | * | 4/1997 | Kvenold et al. | 29/727 |

FOREIGN PATENT DOCUMENTS

| | | | | |
|---|---|---|---|---|
| JP | 01-59220 | * | 10/1982 | 72/196 |
| JP | 02-09740 | * | 9/1986 | 72/197 |
| JP | 09-021133 | * | 1/1997 | |

* cited by examiner

Primary Examiner—Gregory Vidovich
Assistant Examiner—Jermie E. Cozart
(74) Attorney, Agent, or Firm—Nawrocki, Rooney & Sivertson, P.A.

(57) ABSTRACT

A tube remover for extracting a tube from an opening in which the tube is mounted in a wall. The remover includes a nipper roll and an anvil roll, each of which is provided with a plurality of teeth formed in a radially outward facing surface of each respective roll. The teeth, which can be oriented helically in the respective surfaces, mesh and draw the tube into a nip between the two rolls. At least one of the rolls is provided with an anvil block formed in its radially outwardly facing surface. Such an anvil block cooperates with the teeth of the opposite roll to effect distressing of the tube and severing of a segment of the tube from the rest of the tube.

14 Claims, 9 Drawing Sheets

TUBE REMOVER AND METHOD FOR AXIALLY REMOVING A METAL TUBE

This application claims the benefit of Provisional Application No. 60/022,106 filed Jul. 17, 1996

TECHNICAL FIELD

The present invention relates to devices for removing metal tubes from heat exchangers and surface condensers. More specifically, the invention relates to a device capable of both pulling a tube out of a heat exchanger, flattening the tube, and chopping the tube into smaller lengths for disposal.

BACKGROUND OF THE INVENTION

Many heat exchangers utilize tubes for carrying a heat transfer fluid. A large number of tubes are commonly mounted in parallel between two tube sheets. The tube ends are tightly mounted in openings in the tube sheets, forming a tight seal. The tight fit is often effected using a press fit. A high temperature fluid such as combustion gas or hot water is passed between the tube sheets and around the outside of the tubes. A lower temperature heat transfer fluid such as water is passed through the interior of the tubes. Heat is transferred from the higher temperature tube exterior to the lower temperature tube interior.

Tubes often have to be removed from the heat exchanger. Tubes often become corroded, lined with scale or even plugged. Tubes also develop leaks, requiring tube removal. Heat exchanger downtime is often unexpected, and speed is critical in removing one or more tubes, replacing them with others, and returning the heat exchanger to service.

Heat exchanger preventative maintenance is often planned, with several or all tubes in an array being removed and replaced before leaks and severe scaling are likely to occur. In large power generation systems there may be thousands of tubes to replace during the same downtime interval, significantly reducing the power generating capacity while the preventative maintenance is being performed. The downtime in such situations is expensive, the expense depending on how quickly the tubes can be replaced.

Removing tubes from a heat exchanger is accomplished by first relieving the interference fit between the tube and tube sheet. The tubes are axially pulled out a few centimeters to expose a grippable tube end projecting from the tube sheet. Such pulling is accomplished with an internal gripping device called a tube puller. Suitable tube pullers are disclosed in commonly owned U.S. Pat. No. 3,835,520 or U.S. Pat. No. 3,628,246.

After the tube has been loosened and has an end projecting from the tube sheet, a pulling device is used to pull the tube totally out of the tube sheet. A typical pulling device comprises a pair of rotating serrated traveller rolls having parallel axes and rotating in opposite directions. The projecting tube end is introduced into the nip between the rollers. The puller rapidly removes the tube from the tube sheet. Prior art devices for removing long tubes from tube sheets axially at high rates of speed are disclosed in U.S. Pat. Nos. 3,149,021 (Curfman), U.S. Pat. No. 3,785,026 (Ohmstede), U.S. Pat. No. 4,044,444 (Harris) and U.S. Pat. No. 4,815,201 (Harris), the later two invented by the applicant.

The tube can be 10 to 20 meters long in large power installations. This rapidly moving tube typically requires two people to handle the tube as it is being pulled out of the tube sheet. After removal, the tube is feed to a chopper, to cut the tube into pieces to be hauled away as scrap. The use of typical tube pullers thus requires people to handle the withdrawn tube, a separate chopper, and people to feed the withdrawn tube to the chopper. Each additional step requires additional time as well as additional workers.

What remains to be provided is a tube puller which eliminates the need for a separate chopper. A tube puller which does not require additional workers to handle the long tubes being extracted would be desirable. It would also be advantageous to eliminate the safety considerations of maneuvering long tubes into nippers in power houses.

SUMMARY OF THE INVENTION

The present invention is a tube remover for extracting a tube from an opening in a wall in which the tube is mounted. The remover includes a nipper roll and an anvil roll. Each roll has, formed on a radially outward facing surface thereof, a plurality of teeth. Further, each roll is disposed for rotation about an axis. The axes of rotation are spaced from one another so that the rolls, together, define a nip within which the tube to be removed can be fed. The rolls are rotated in opposite directions and draw the tube into the nip and between the rolls. A cutting surface is provided on one of the rolls, and, as the cutting surface and teeth on the opposing roll cooperate to distress the pinched tube as it passes between the rolls, the tube is cut at a desired length.

In a preferred embodiment, the teeth formed on both the nipper roll and the anvil roll are helically oriented. The angle of helical disposition is such that, when the rolls rotate with respect to one another, the teeth mesh.

In the preferred embodiment also, teeth provided on the outwardly facing surface of the anvil roll are inclined at a designated angle. This enables more secure retention of the tube and more efficient drawing of the tube between the rolls.

Further, the preferred embodiment employs a nipper roll and an anvil roll which have different diameters. In consequence, the teeth on the nipper roll, as the nipper roll is rotated, engage different teeth on the anvil roll on subsequent rotations.

The present invention is thus an improved tube remover apparatus which addresses problems and dictates of the prior art. More specific features and advantages obtained in view of those features will become apparent with reference to the DETAILED DESCRIPTION OF THE INVENTION, appended claims and accompanying drawing figures.

DETAILED DESCRIPTION OF THE INVENTION

Figure 1:
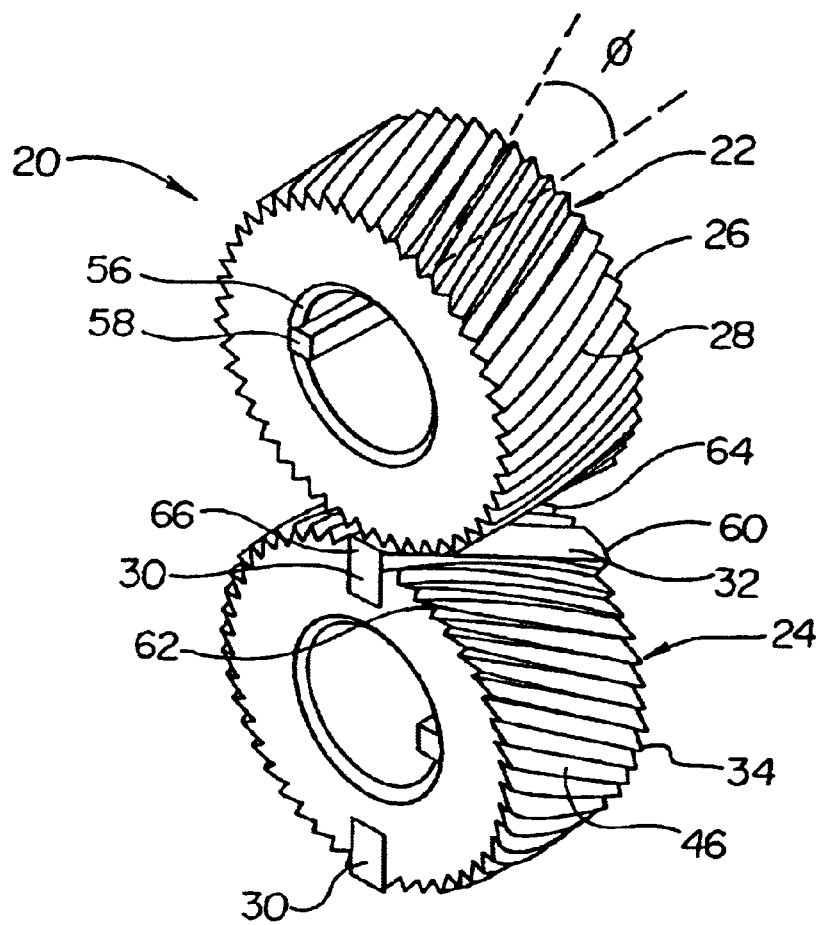
FIG. 1 is a perspective view of a tube remover.

FIG. 1 illustrates an embodiment of a tube remover 20 having a nipper roll 22 and an anvil roll 24. Nipper roll 22 has nipper teeth 26 having a tooth ridge 28, with nipper teeth 26 having a helical orientation on nipper roll 22. Anvil roll 24 has teeth 34 having a helical orientation, a tooth ridge 46, and anvil block inserts 30 each having a cutting surface 32. In a preferred embodiment, both rolls 22 and 24 are mounted on driven shafts (not shown) using keys 58. As illustrated, rolls 22 and 24 have chamfer 56 on the outside edge of the inner radial opening. In a preferred embodiment, both rolls 22 and 24 are driven by hydraulic motors hydraulically connected either in series or in parallel using a flow divider.

Figure 2:
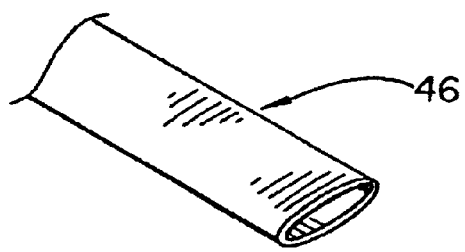
FIG. 2 is a fragmentary perspective view of a tube end prior to removal.

FIG. 2 illustrates a typical tube 46 before engagement with the tube remover. The Tube 46 illustrated has a partially flattened profile. The present invention works equally well with tubes having circular profiles (not shown).

Figure 3:
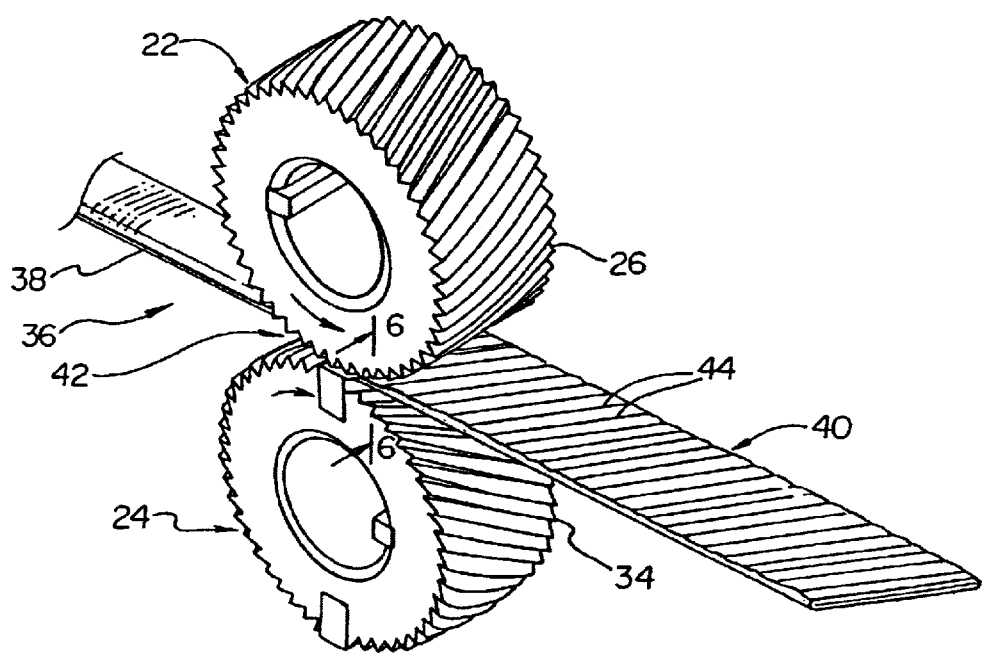
FIG. 3 is a perspective view of a tube remover pulling and flattening a tube.

FIG. 3 illustrates the tube remover embodiment depicted in FIG. 1 pulling, flattening and cutting tube 36. Nipper roll 22 and anvil roll 24 rotate in opposite directions, nipper roll 22 shown rotating counter-clockwise and anvil roll 24 clockwise, acting to pull tube 38 into nip 42. Tube 36 includes an un-flattened portion 38 and flattened portion 40. Flattened portion 40 is shown having crimp marks 44 made by nipper teeth 26 and anvil roll teeth 34.

Figure 4:
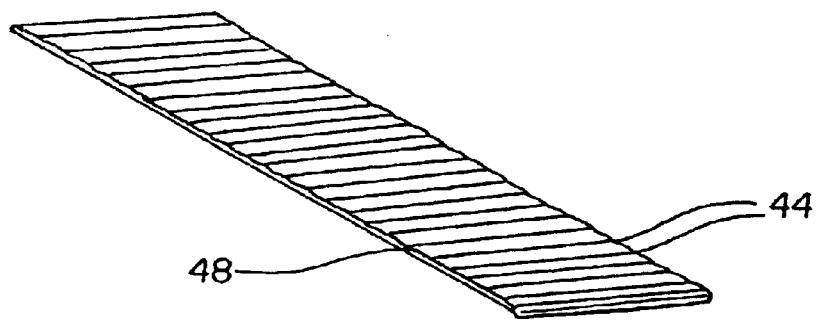
FIG. 4 is a perspective view of a tubing piece flattened and cut by a tube remover.

FIG. 4 illustrates tube detached flattened portion 48 after cutting, having crimp marks 44. Flattened portion 48 results from tube flattened portion 40 being cut between cutting surface 32 and nipper teeth 26.

Figure 5:
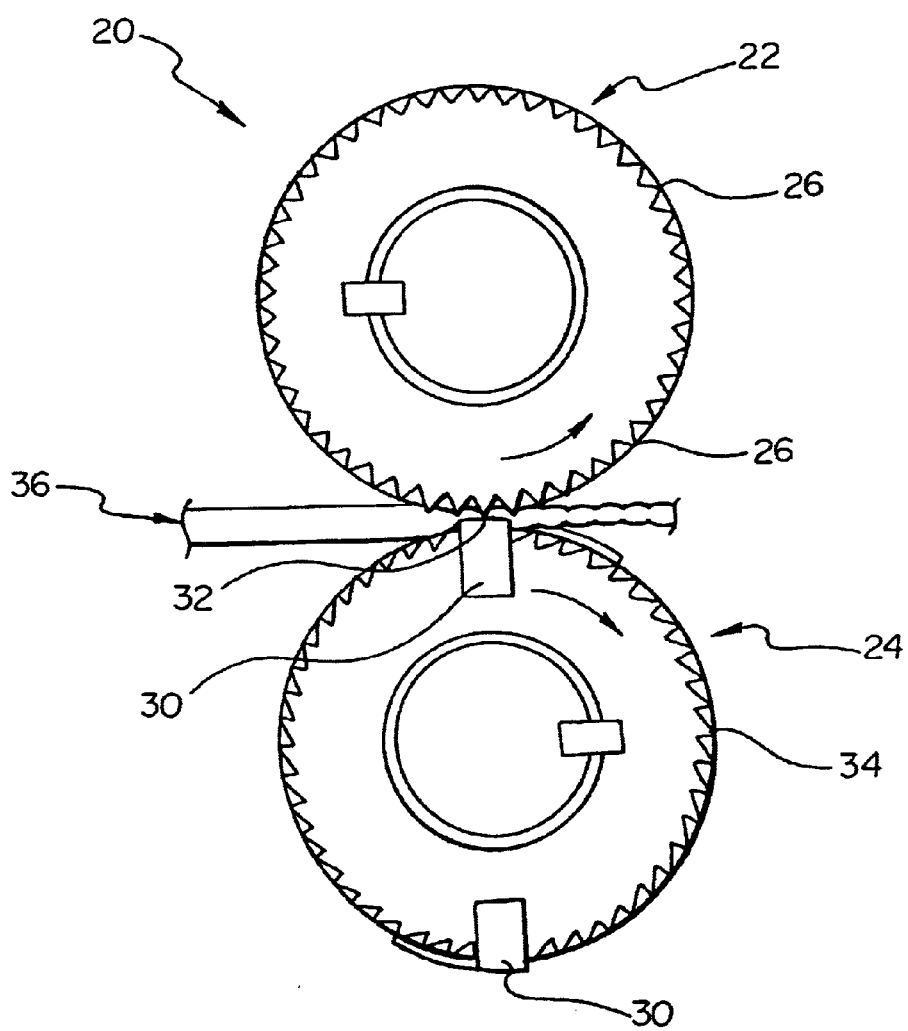
FIG. 5 is an elevation view of a tube remover pulling and cutting a tube.

FIG. 5 illustrates tube remover 20 removing tube 36. A preferred embodiment is shown, having two anvil blocks 30 on anvil roll 24. Embodiments having one or more anvil blocks are within the scope of the invention. A preferred embodiment utilizes anvil block inserts 30 each having a cutting surface 32 to support the flattened tube during nipping. Rolls having integral cutting are also within the scope of the invention. The cutting surface embodiment shown in FIG. 5 has a surface geometry approximating that of a cylinder having the radius of the anvil roll. Another embodiment has a flat cutting surface. A preferred embodiment anvil insert 30 is formed of hardened tool steel for long life. Another preferred anvil insert is made of carbide steel. A most preferred embodiment cutting surface 32 has a width equal to about 1 and ¼ times the distance between nipper teeth 26 to insure a tube cut upon cutting surface 32 by at least one tooth.

Figure 6:
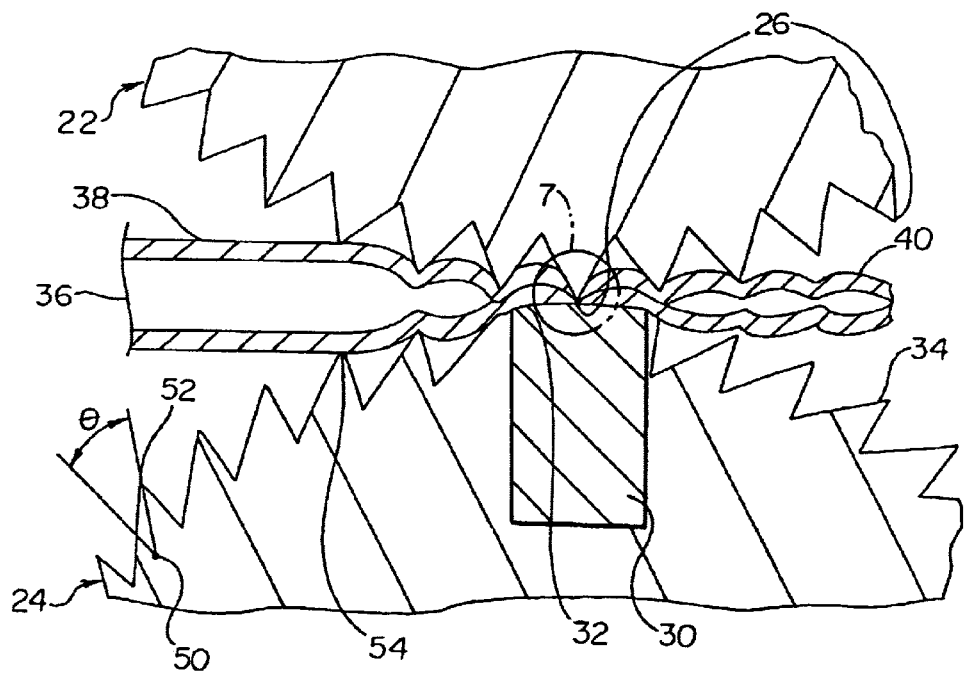
FIG. 6 is an enlarged elevation view of the tube remover depicted in FIG. 3 taken along line 6—6, pulling, flattening and cutting a tube.

FIG. 6 illustrates the embodiment of FIG. 5, showing tube cutting in detail. The embodiment shown has nipper teeth 26 being normal to the circumference of nipper roll 22 and anvil roll teeth 34 having an incline angle θ relative to normal. Specifically, a line drawn from an anvil roll tooth base midpoint 50 through tooth apex 52 forms an angle θ with respect to a line drawn through both the same tooth base midpoint 50 and the anvil roll axis of rotation. Teeth having an incline angle provide increased gripping by teeth 34 of tube 36. As illustrated in FIG. 6, when nipper tooth 26 severs tube 36, freeing flattened portion 40, the nipper tooth no longer has the ability to pull the tube at the point where the tube was cut. Nipper teeth past the point of severance have the ability to pull the severed piece 40, but not the ability to pull tube piece 38. The presence of anvil block 30 in place of teeth 34 on the anvil roll also diminishes the ability of the anvil roll to pull tube 36. The advantage of the incline angle is illustrated by the tooth at 54, having increased purchase of tube 36, giving some additional grip to compensate for the diminished anvil roll grip at cutting surface 32. A preferred embodiment has a significant positive incline angle θ for anvil roll teeth 34.

Figure 7:
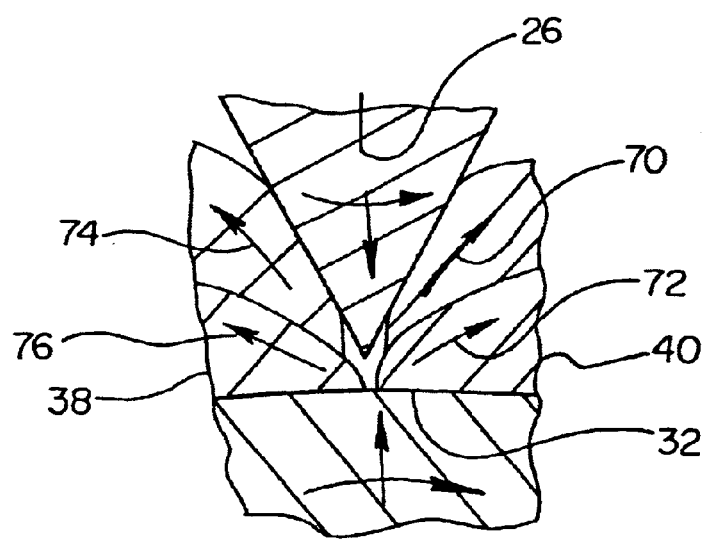
FIG. 7 is a more enlarged elevation view of the tube remover detail area of FIG. 6.

FIG. 7 illustrates in detail the cutting action of tube 36 between a nipper tooth 26 and cutting surface 32. In a preferred embodiment, nipper tooth 26 does not touch cutting surface 32. Rather, nipper tooth 26 distresses tube 36 by a wedging action, forcing the tube material apart and away from the cutting surface. The distress and movement of material in severed tube top 70, severed tube bottom 72, still attached tube top 74, and still attached tube bottom 76 is illustrated by the respective arrows in FIG. 7. The tube material is distressed to the point where the tube separates into flattened portion 40 and un-flattened portion 38. Tube remover embodiments in which nipper tooth 26 touches cutting surface 32 increases wear on both tooth 26 and cutting surface 32.

Figure 8:
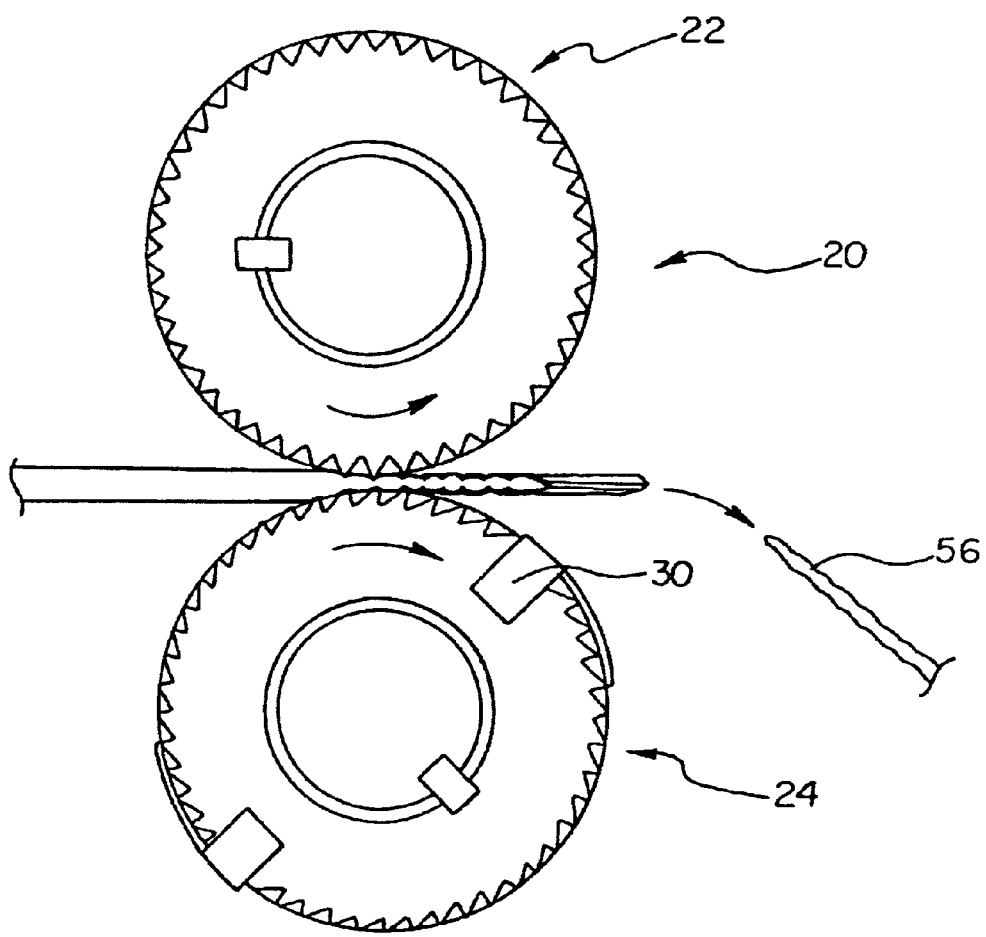
FIG. 8 is an elevation view of the tube remover depicted in FIG. 5, showing a cut tubing piece separating from the main tubing piece.

FIG. 8 illustrates a severed piece 56 falling away from tube remover 20. In use, the rotation of rolls 22 and 24 impart an axial velocity to tube 36 and severed portion 56 such that the piece is ejected down and away from the tube remover. In preferred use, the severed piece falls directly into a scrap bin. FIG. 8 shows severed piece 56, having been cut on anvil block 30, given forward momentum, resulting in the trajectory shown.

Figure 9:
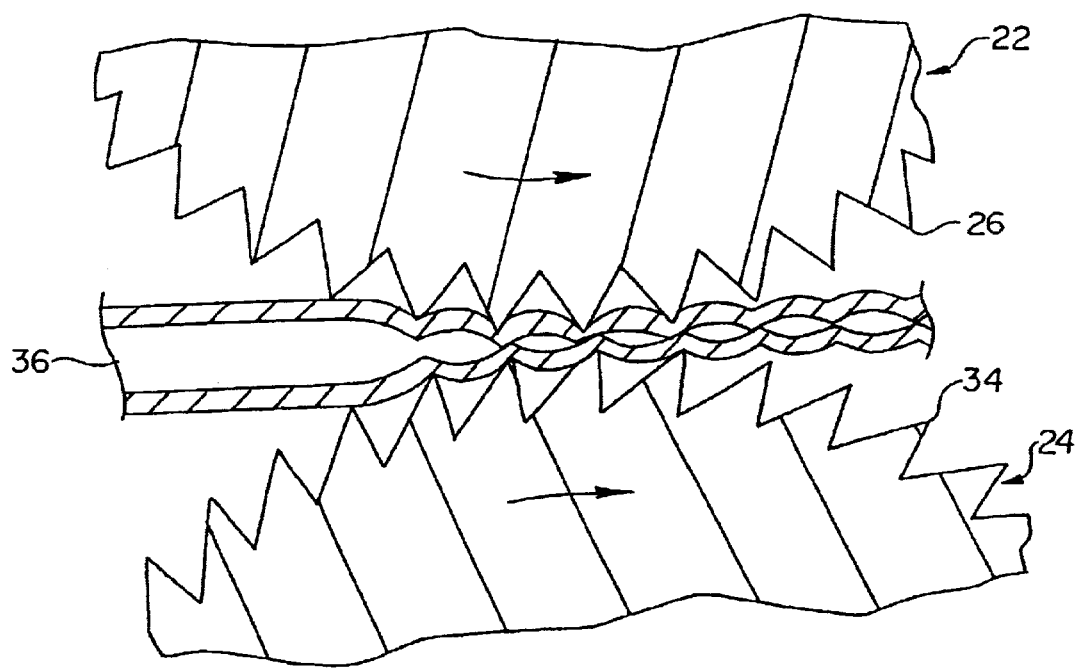
FIG. 9 is an enlarged elevation view of the tube remover depicted in FIG. 8, showing the teeth engaging, flattening and crimping a tube.

FIG. 9 further illustrates the flattening and crimping action in an area away from cutting surface 32. Tube 36 is shown being pulled axially between anvil roll teeth 34 and nipper roll teeth 26.

Referring to FIG. 1, the helical orientation of both cutting surface 32 and teeth 26 and 34 is illustrated. The helical angle φ is denoted in FIG. 1. In a preferred embodiment, teeth 26 and 34 are oriented helically across the roll surface as in a helical gear, rather than straight across as in a spur gear. In a preferred embodiment, cutting surface 32 is also oriented helically. The helical tooth arrangement provides increased pulling ability while the tube is being cut, relative to a spur arrangement. If cutting surface 32 and teeth 26 were both oriented straight across, the entire tube would be line cut at the same instant in time. Prior to this instant, tube 36 would be pulled mainly by teeth 34 past cutting surface 32 and some by teeth at 64, before cutting surface 32. After this cutting instant, as shown in FIG. 6, only the relatively weak grip of the teeth before cutting surface 32 would remain.

As illustrated in FIG. 1, when the cutting surface at 60 is under the tube portion being cut, teeth at 62 are gripping a soon to be cut, but still attached, portion of the tube. When the cutting surface at 66 is under the tube portion being cut, teeth at 64 are gripping a newly formed end of the tube. In this way, grip is increased and the chance of jamming or loss of grip is decreased. A less desirable embodiment, having cutting surface and teeth in straight across orientation, has decreased grip and increased chance of jamming or loss of grip. The helical orientation has the added advantage of providing a point cut of tube 36 over a time interval rather than a line cut across the tube at the same instant. This progressing cut causes less shock to the tube remover, decreasing both maintenance and the chance of jamming or loss of the pulling grip.

In a preferred embodiment, rolls 22 and 24 have a width of about 2 inches and a diameter of about 4 inches. Such an embodiment has 48 teeth in each roll. This embodiment has a tooth and cutting surface helical angle φ of about 30 degrees relative to the straight across spur arrangement.

The preferred embodiment has one roll slightly smaller than the other. In the preferred embodiment, the size difference is provided by the non-zero incline angle of the anvil roll teeth alone, resulting in a smaller diameter than, if the teeth had an orientation normal to the roll. When the rolls are driven by hydraulic motors connected either in series or through a flow divider and the rolls rotating at about the same speed, this slight size difference causes the anvil roll cutting surface to be presented to a different nipper tooth on successive rotations. This succession results in an even distribution of wear over all nipper teeth rather than the concentrated wear that would result from perfectly synchronized, matched rolls. The even wear distribution allows for decreased maintenance.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A tube remover for extracting a tube from an opening in which the tube is mounted in a wall, comprising:
   (a) a nipper roll, disposed for rotation about a first axis, having a radially outward facing surface and a plurality of teeth, oriented helically across an entire width of said nipper roll relative to said first axis, formed therein;
   (b) an anvil roll, disposed for rotation about a second axis, having a radially outward facing surface and a plurality of teeth, oriented helically across an entire width of said anvil roll relative to said second axis, formed therein, said anvil roll and said nipper roll having different diameters and spaced from each other at a distance such that, as said rolls are made to rotate in opposite directions, teeth formed in said nipper roll surface register with different teeth formed in said anvil roll surface on successive rotation of said rolls, wherein generally even distribution of wear occurs over said teeth formed in said outward facing surface of said nipper roll; and,
   (c) at least one anvil block formed in said radially outward facing surface of said anvil roll interrupting said teeth formed in said anvil roll surface.

2. A tube remover in accordance with claim 1 comprising a plurality of anvil blocks in said radially outward facing surface of said anvil roll.

3. A tube remover in accordance with claim 2 wherein said anvil blocks are spaced circumferentially from one another at substantially equal intervals.

4. A tube remover for axially removing a metal tube disposed along an axis, comprising:
   a first roll having a first axis of rotation and a plurality of teeth, each tooth having a helical configuration across an entire width of said first roll in a direction parallel to said first axis of rotation;
   a second roll having a second axis of rotation and a plurality of teeth, each tooth having a helical configuration across an entire width of said first roll in a direction parallel to said second axis of rotation;
   means for operably disposing said first and second rolls on either side of the tube axis, wherein said roll axes of rotation are substantially parallel to each other and perpendicular to the tube axis;
   means for rotating said rolls in directions so as to pull the tube axially toward said rolls; and an anvil surface on at least one of said rolls, said edges of said plurality of teeth of said at least one of said rolls being disposed upon a radially outward facing surface thereof, each of said edges of said plurality of teeth being oriented obliquely with respect to the axis of the tube.

5. A tube remover as recited in claim 4, wherein said anvil surface roll teeth are helically oriented.

6. A tube remover as recited in claim 4, wherein said rotation means is a hydraulic motor.

7. A tube remover as recited in claim 4, wherein said anvil surface is on an anvil block insert.

8. A tube remover as recited in claim 7, wherein said anvil surface roll has two anvil block inserts spaced circumferentially from one another at substantially 180°.

9. A tube remover as recited in claim 7, wherein said anvil surface is formed of metals selected from the group consisting of hardened tool steel and carbide steel.

10. A tube remover as recited in claim 7, wherein said anvil surface has a width of between 1 and 3 teeth spacings.

11. A method for axially removing a metal tube mounted in an opening formed through a tube sheet, comprising:
   providing first and second rolls, each roll having a plurality of teeth disposed about a radially outward facing surface thereof, each tooth having an edge oriented helically across an entire width of each of the first and second rolls relative to an axis of each roll, at least one of said rolls having a cutting surface;
   pulling said tube axially away from said tube sheet until said first and second rolls are able to grippingly engage said tube;
   disposing said first and second rolls on opposite sides of said tube at a distance such that said teeth grippingly engage said tube;
   rotating said first and second rolls in opposite directions;
   pulling said tube between said rolls and away from said tube sheet; and
   progressively cutting said tube between said teeth and said cutting surface.

12. A method for axially removing a metal tube as recited in claim 11, wherein said distance is such that said teeth do not contact said cutting surface.

13. A method for axially removing a metal tube as recited in claim 12, wherein said teeth on any cutting surface roll have an angle of incline.

14. A tube remover for extracting a tube from an opening in which the tube is mounted in a wall, comprising:
   (a) a nipper roll, disposed for rotation about a first axis, having a radially outward facing surface and a plurality of teeth, oriented helically across an entire width of said nipper roll relative to said first axis, formed therein;
   (b) an anvil roll, disposed for rotation about a second axis, having a radially outward facing surface and a plurality of teeth, oriented helically across an entire width of said anvil roll relative to said second axis, formed therein, said anvil roll and said nipper roll having different diameters and spaced from each other at a distance such that, as said rolls are made to rotate in opposite directions, teeth formed in said nipper roll surface interact with different teeth formed in said anvil roll surface on successive rotation of said rolls; and
   (c) at least one anvil block formed in said radially outward facing surface of said anvil roll interrupting said teeth formed in said anvil roll surface.

* * * * *